United States Patent [19]
Kiffmeyer et al.

[11] 3,752,969
[45] Aug. 14, 1973

[54] METHOD AND MEANS FOR UPDATING THE POSITION DIMENSION OF A NUMERICALLY CONTROLLED MACHINE TOOL

[75] Inventors: William W. Kiffmeyer; Joseph D. Radtke, both of Milwaukee, Wis.

[73] Assignee: Allen-Bradley Company, Milwaukee, Wis.

[22] Filed: Sept. 24, 1971

[21] Appl. No.: 183,496

[52] U.S. Cl........ 235/151.11, 235/92 MP, 318/569, 318/594, 318/601
[51] Int. Cl............................................. G06f 15/46
[58] Field of Search.................. 235/151.11, 92 MP, 235/92 EC; 318/569–570, 574, 592, 594, 600–601; 340/146.2, 347 P, 347 AD

[56] References Cited
UNITED STATES PATENTS

| | | |
|---|---|---|
| 3,585,376 | 6/1971 | Toscano ..................... 235/92 EC X |
| 3,500,023 | 3/1970 | Arrowood et al.......... 235/151.11 X |
| 3,513,371 | 5/1970 | Hoppe ................................. 318/594 |
| 3,612,840 | 10/1971 | Stobbe............................. 318/569 X |
| 3,172,026 | 3/1965 | Schuman ........................ 318/569 X |
| 3,517,286 | 6/1970 | Stobbe.............................. 318/574 |
| 3,665,280 | 5/1972 | Payne et al. ................ 235/151.11 X |

*Primary Examiner*—Eugene G. Botz
*Assistant Examiner*—Jerry Smith
*Attorney*—Barry E. Sammons

[57] ABSTRACT

A machine position dimension contained in a storage register is compared with a command position dimension contained in a position unit to obtain a digital error signal for controlling a machine tool. Increments of displacement are sensed by an eight-position shaft encoder. The shaft encoder output is periodically compared with the least significant digit in the storage register, and when necessary, counts are generated to the storage register to update the machine position dimension.

6 Claims, 2 Drawing Figures

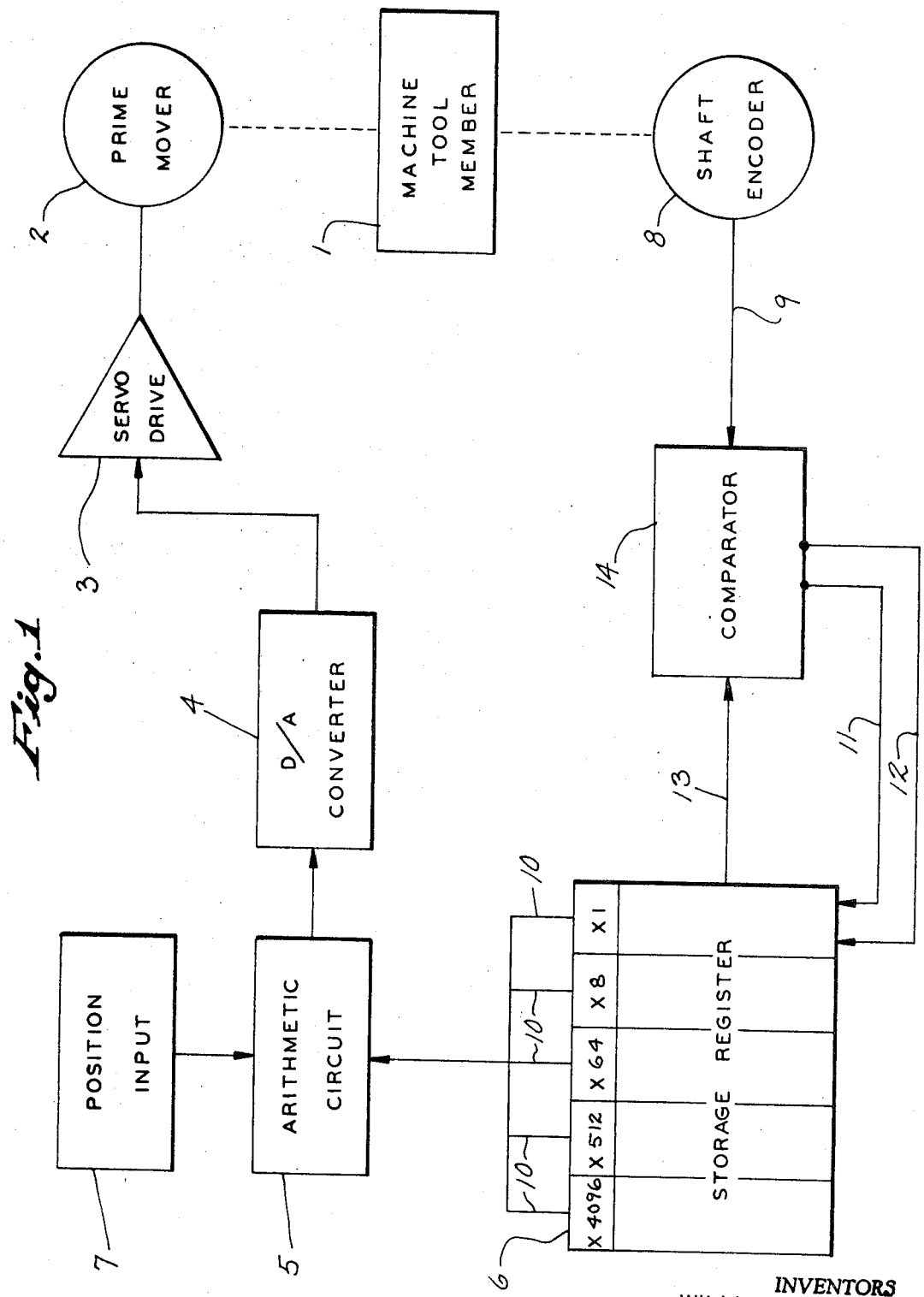

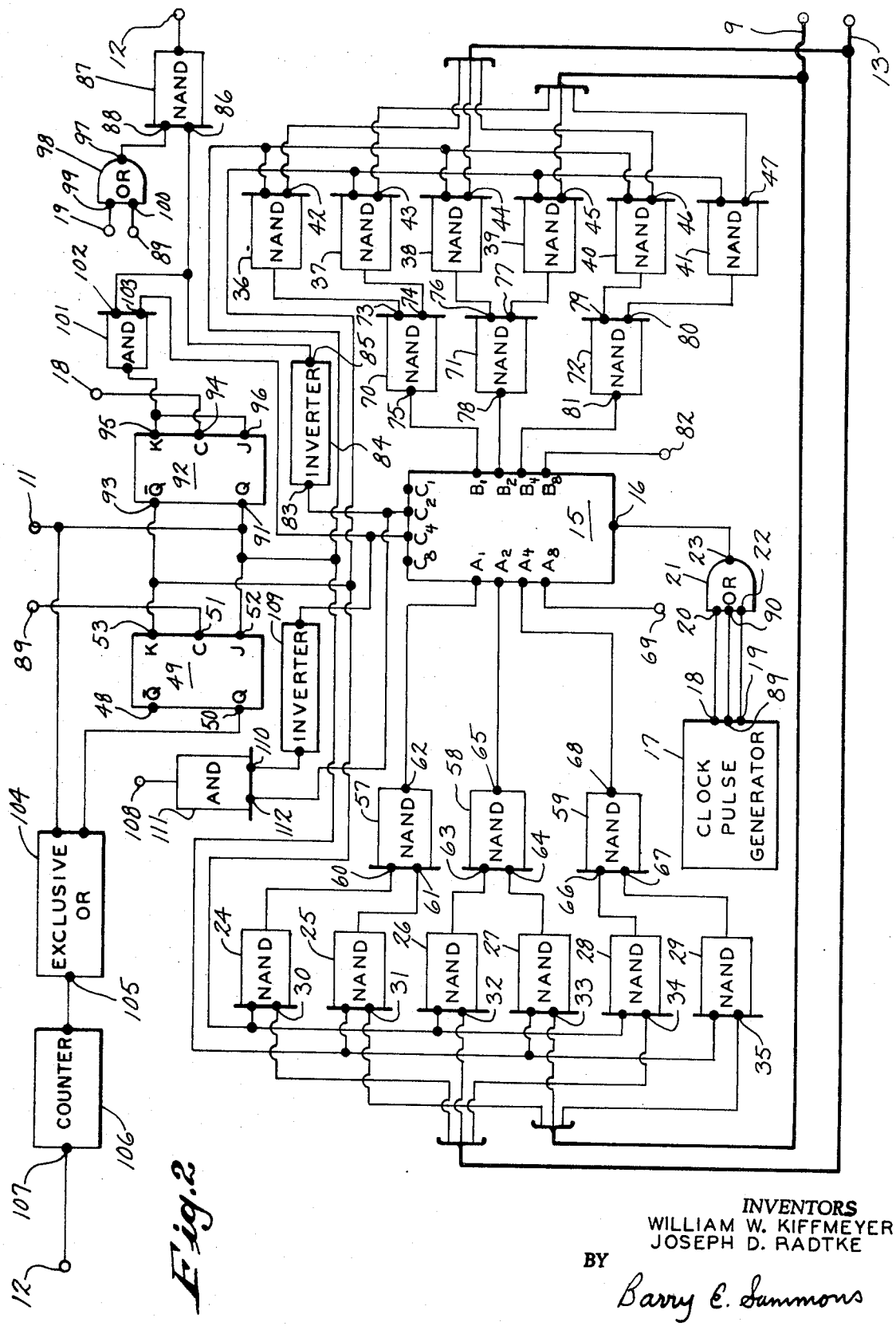

METHOD AND MEANS FOR UPDATING THE POSITION DIMENSION OF A NUMERICALLY CONTROLLED MACHINE TOOL

BACKGROUND OF THE INVENTION

The invention relates to position transducers, and particularly to digital position transducers connected to sense the displacement of machine tool members.

Such digital transducers are of two basic types — incremental and absolute. Digital incremental position transducers connect to the moving machine member and operate to generate a voltage pulse each time the member moves a fixed distance, or increment with respect to the machine frame. These voltage pulses are counted by a numerical control system which either sums them to indicate the present machine member position, or subtracts them from a dimension representing the distance yet to be traveled by the machine member. In either case, incremental transducers introduce a number of problems. First, because the numerical control digital circuitry is designed to count voltage pulses, the circuitry is susceptible to errors resulting from the injection of noise pulses common in machine shop environments. Such noise pulses are counted and introduce a permanent error in the machine position dimension which is not detectable. Also, because each voltage pulse generated by an incremental transducer must be counted, the numerical control system must be dedicated to this task, or in other words, to continuously monitor the output of the incremental transducer. Such dedication is undesirable when digital computers are to be used to process the information. The computer must be made available to monitor and control other machine functions at the same time in order to justify its cost.

Digital absolute transducers are also connected to the moving machine member, but instead of generating voltage pulses, they generate voltage levels which represent, in coded form, the total displacement of the machine member from a fixed reference point. Although errors due to noise injection are eliminated because the control circuitry is designed to respond to voltage levels rather than pulses, high resolution numerical control systems using absolute encoders capable of generating one million discrete signals, or in other words, capable of detecting very small increments of machine displacement, and at the same time having a capacity sufficient to indicate positions throughout the entire range of machine member movement, are very costly. For example, a milling machine having a table movement capability of 100 inches and a desired resolution of 0.0001 inches, requires the use of an absolute encoder capable of generating one million discrete signals, or in other words, capable of generating a 20-bit binary coded digital signal.

SUMMARY OF THE INVENTION

The invention is a hybrid digital transducer which incorporates the advantages of both the incremental an absolute position transducer. More specifically, the invention comprises a transducer in which the least significant digit of the machine position dimension is generated by an absolute encoder, which encoder output signal is generated through a comparator circuit to update the least significant digit stored in a machine position storage register. The absolute encoder senses each increment of machine displacement and adds (or subtracts depending on machine direction) an increment, or count to its encoded output signal. The count embodied in the encoder output signal is periodically compared with the least significant digit in the storage register, and the comparator circuit operates to update that least significant digit when the absolute encoder count leads the storage register count in the direction of machine motion.

If the machine dimension is expressed in octal digits for example, the absolute encoder need only have a range sufficient to accurately indicate eight increments of machine member displacement. The absolute encoder operates to continuously and periodically update the least significant octal digit stored in the machine position storage register. Thus, over the eight increment range of the absolute encoder, the invented position transducer operates as an absolute system. On the other hand, machine member displacements outside the eight-increment range cause an addition (or subtraction depending on machine direction) to the next most significant digit of the machine position dimension in the machine storage register. Thus, for relatively large machine displacements (eight increments or more) the invented transducer operates as an incremental system. After such an addition (or subtraction) is made, the absolute encoder again cycles through its eight increment operating range, its output signal being periodically used to update the least significant digit in the storage register.

The general object of the invention is to provide a position transducer which has a high noise immunity. Because the signal output of the absolute encoder is in the form of voltage levels rather than pulses, injected noise pulses do not introduce permanent error. Erroneous counts entered into the least significant digit of the machine dimension in the storage register are corrected each time the absolute encoder output signal is compared with it. For example, if a count has been erroneously added to the least significant digit, one less count is subsequently added when the comparison is made to update the storage register with the absolute encoder output signal. Likewise, if a count is erroneously subtracted from the machine position dimension additional counts are added during the subsequent comparison to correct the error.

Another general object of the invention is to provide a position transducer which need not be continuously monitored by the digital circuitry. Because the absolute encoder retains position information within an eight increment range of machine motion, its output need only be monitored periodically in order to update the storage register. In other words, the absolute encoder serves as a temporary memory. Thus, while the machine member is moving within the eight increment range of the absolute encoder, much of the digital circuitry can be used to perform other machine functions, such as monitoring the position information of the remaining two axes of machine motions.

The foregoing and other objects and advantages of the inventon will appear from the following description. In the description reference is made to the accompanying drawings which form a part hereof, and in which there is shown a preferred embodiment of the invention. Such embodiment does not necessarily represent the full scope of the invention, and reference, therefore, is made to the claims herein for interpreting the breadth of the invention.

BRIEF DESCRIPTION OF THE DRAWINGS

FIG. 1 is a block diagram of a numerical control system incorporating the present invention, and FIG. 2 is a circuit diagram of the comparator circuit which forms a part of the present invention.

DESCRIPTION OF THE PREFERRED EMBODIMENT

Referring to FIG. 1, a machine tool member 1 is shown connected to a prime mover 2. Prime mover 2 may be either an electric or hydraulic motor connected to move the member 1 when rotated. The direction and speed of rotation is controlled by a servo drive 3 which in turn operates in response to an analog error signal received from a digital to analog (D/A) converter 4. The D/A converter 4 produces an analog error signal which is directly proportional to a digital error signal generated by an arithmetic circuit 5. The digital error signal is produced by subtracting, a machine position dimension contained in a storage register 6 from a command position dimension contained in a position input circuit 7.

The numerical control system described is a standard point-to-point position control system. The general purpose of the system is to move a machine tool member 1, such as the slide on a milling machine, from its present position indicated by the machine position dimension to a desired position indicated by the command position dimension. The actual machine tool member position is contained in the storage register 6, and the arithmetic circuit 5 operates to periodically compare the actual machine position with the commanded position and generate a digital error signal which indicates the direction and distance to travel. The sign of this digital error signal contains the directional information, and its magnitude contains the distance information. The D/A converter 4 and servo drive 3, operate to drive the prime mover 2 and move the machine tool member 1 towards the commanded position until the digital error signal is reduced to zero. Other numerical control systems, including contouring systems, operate in the same general fashion — they all require a means of sensing and generating a machine position dimension which accurately reflects the actual machine tool member position. In the preferred embodiment described herein, this machine position dimension is stored in the storage register 6, and it represents the actual position of the machine tool member 1 with respect to a fixed reference point on the machine tool.

The present invention comprises a means of sensing the movement of the machine tool member 1 and accurately "updating" the machine position dimension contained in the storage register 6. The invented position transducer includes a shaft encoder 8 connected to the machine tool member 1 to sense displacement. The shaft encoder 8 is a commercially available eight-digit transducer which generates a three-bit digital output signal through an encoder bus 9. The three bits are "weighted" 1, 2 and 4 respectively, and the three-bit digital signal on the encoder bus 9 represents one of the octal numbers 0–7. The shaft encoder 8 is mechanically connected to the machine tool member 1 to have a resolution of 0.001 inches. In other words, for each 0.001 inch increment of machine tool member displacement, the logic state of one or more of the three encoder output signals changes to register the change in machine tool member position. Although the encoder 8 is geared for high resolution, its three-bit capacity limits it to a dynamic range of only eight increments, or 0.008 inches.

As discussed above, the storage register 6 counts the increments of machine tool member displacement from a fixed reference point and periodically indicates to the arithmetic circuit 5 the present position of the machine tool member 1. The storage register 6 has the capacity to store a five-digit octal number representing the machine position dimension, and to read it out periodically in parallel form to the arithmetic circuit 5 through the leads 10. The least significant digit (LSD) of the five-digit position dimension in the storage register 6 is altered one count for each increment of machine tool member displacement. The storage register 6 is updated one increment by applying either a logic high or logic low voltage to a direction bus 11, and simultaneously applying a positive voltage step to a counter bus 12. The updated least significant digit of the machine position dimension is continuously generated through a register bus 13 to a comparator circuit 14. As with the encoder output, this signal is a three-bit digital signal which is weighted 1, 2 and 4, and represents one of the octal numbers 0–7.

The comparator circuit 14 operates through the direction and counter buses 11 and 12 to update the machine position dimension in the storage register 6 by adding or subtracting counts from the least significant digit in response to the three-bit digital signals generated on the encoder bus 9 and register bus 13. Referring to FIG. 2, the comparator circuit 14 includes a subtractor 15 connected to receive and determine the arithmetic difference between the three-bit digital signals on the encoder bus 9 and register but 13. The subtractor 15 is a four-bit arithmetic logic unit commercially available in integrated circuit form. The subtractor 15 is adapted to receive weighted digital signals at four input terminals $A_1$, $A_2$, $A_4$, and $A_8$; and subtract therefrom weighted digital signals received at four input terminals $B_1$, $B_2$, $B_4$, and $B_8$. The result appears at a set of four output terminals $C_1$, $C_2$, $C_4$, and $C_8$ each time a positive clock pulse is applied to a strobe terminal 16.

A three-phase clock pulse generator 1 produces a continuous train of equally spaced clock pulses at a first phase output terminal 18, a second train of clock pulses at a second phase output terminal 19, and a third train of clock pulses at a third phase output terminal 89. The three pulse trains are phase displaced 120° from one another. The first phase output terminal 18 is connected to a first input terminal 20 on an OR gate 21, the second phase output terminal 19 is connected to a second input terminal 22 on the OR gate 21, and the third phase output terminal 89 is connected to a third input terminal 90 on the OR gate 21. The OR gate 21 is a standard logic gate which operates to generate a logic high at an output terminal 23 when a logic high voltage is applied to any of its three input terminals 20, 22 or 90. The OR gate output terminal 23 is connected to the strobe terminal 16 on the subtractor 15, and consequently, the first, second and third phase clock pulse trains are generated to the subtractor 15.

The encoder bus 9 and register bus 13 connect to a set of six minuend NAND gates 24–29. As discussed above, each bus 9 and 13 contains three lines which conduct the "1," "2" and "4" weighted digits from the shaft encoder 8 and the storage register 6. The "1" digit lead of the register bus 13 connects to an input terminal 30 on the first minuend NAND gate 24, and the "1" digit lead of the encoder bus 9 connects to an input terminal 31 on the second minuend NAND gate 25. The "2" digit lead of the register bus 13 connects to an input terminal 32 on the third minuend NAND gate 26, and the "2" digit lead of the encoder bus 9 connects to an input terminal 33 on the fourth minuend NAND gate 27. Likewise, the "4" digit lead of the register bus 13 connects to an input terminal 34 on the fifth minuend NAND gate 28, and the "4" digit lead of the encoder bus 9 connects to an input terminal 35 on the sixth minuend NAND gate 29.

The encoder bus 9 and register bus 13 are also connected in identical fashion to a set of six subtrahend NAND gates 36–41. More specifically, the "1" digit leads of the respective buses 13 and 9 are connected to respective input terminals 42 and 43 on the first and second subtrahend NAND gates 36 and 37, the "2" digit leads are connected to input terminals 44 and 45 on the third and fourth subtrahend NAND gates 38 and 39, and the "4" digit leads are connected to input terminals 46 and 47 on the fifth and sixth subtrahend NAND gates 40 and 41. The minuend NAND gates 24–29, and the subrahend NAND gates 36–41 are commercially available logic gates which operate to generate a logic high voltage at their output terminals until logic high voltages are applied to both their input terminals.

The second input terminal on each of the minuend NAND gates 24–29 and subtrahend NAND gates 36–41 are connected as follows. The second input terminal on the first, third and fifth minuend NAND gates 24, 26 and 28 are connected to a $\bar{Q}$ terminal 93 on a second J–K flip-flop 92. The second input terminals on the second, fourth and sixth minuend NAND gates 25, 27 and 29 are connected to a Q terminal 91 on the second J–K flip-flop 92. On the other hand, the connections of the subtrahend NAND gates 36–41 are reversed. More specifically, the second input terminals on the first, third, and fifth subtrahend NAND gates 36, 38 and 40 are connected to the Q terminal 91, and the second input terminals on the second, fourth, and sixth subtrahend NAND gates 37, 39 and 41 are connected to the $\bar{Q}$ terminal 93. The $\bar{Q}$ terminal 93 is also connected to a K terminal 53 on a first J-K flip-flop 49 and Q terminal 91 is connected to the direction bus 11. Second J-K flip-flop 92 also has a clock terminal 94 connected to the first clock phase output terminal 18 and a J and a K terminal 96 and 95 each connected to the output of an AND gate 101. An input terminal 102 on the AND gate 101 connects to the output terminal 85 of an inverter 84, and a second input terminal 103 connects to subtractor output terminal $C_4$.

The first J-K flip-flop 49 has a clock terminal 51, a J terminal 52, and a K terminal 53. The J terminal 52 is connected to Q terminal 91 on second J-K flip-flop 92, and its clock terminal 51 connects to the third clock phase output terminal 89. The J-K flip-flops 49 and 92 are bistable in either a set condition in which their Q output terminal is in a logic high state and their $\bar{Q}$ terminal is in a logic low state, or in a reset condition in which their Q terminal is in a logic low state and their $\bar{Q}$ terminal is in a logic high state. The J-K flip-flops 49 and 92 are set by a negative voltage step applied to their clock terminal when a logic high voltage is applied to their J terminal and a logic low voltage is applied to their K terminal 53. They are reset by a negative voltage step applied to their clock terminal when a logic high voltage is applied to their K terminal. Also, if logic high voltages are applied to both their J terminal and K terminal, the J-K flip-flops change state when a clock pulse is received.

The Q terminal 50 and and Q terminal 91 on the respective J-K flip-flops 49 and 92 are each connected to input terminals on an exclusive OR gate 104. The exclusive OR gate 104 is a commercially available logic gate which generates a logic high voltage at an output terminal 105 when the logic states of the voltages applied to its two input terminals are opposite. The OR gate output terminal 105 connects to a three-bit counter 106. The counter 106 generates three pulses at a relatively high rate at an output termianl 107 which connects to the counter bus 12.

The minuend NAND gates 24–29 are connected to the subtractor 15 by means of three summing NAND gates 57–59. More specifically, the output of the first minuend NAND gate connects to a first input terminal 60 on the first summing NAND gate 57, the output terminal of the second minuend NAND gate 25 connects to a second input terminal 61 on the first summing NAND gate 57, and an output terminal 62 on the first summing NAND gate 57 connects to the subtractor input terminal $A_1$. Similarly, the output terminal of the third minuend NAND gate 26 connects to a first input terminal 63 on the second summing NAND gate 58, the output terminal of the fourth minuend NAND gate 27 connects to a second input terminal 64 on the second summing NAND gate 58, and an output terminal 65 on the second summing NAND gate 58 connects to the subtractor input terminal $A_2$. And finally, the output terminal of the fifth minuend NAND gate 28 connects to a first input terminal 66 on the third summing NAND gate 59, the output terminal of the sixth minuend NAND gate 29 connects to a second input 67 on the third summing NAND gate 59, and an output terminal 68 on the third summing NAND gate 59 connects to the subtractor input terminal $A_4$. The subtractor input terminal $A_8$ is connected to a logic high voltage source terminal 69.

The subtrahend NAND gates 36–41 connect to the subtractor 15 through a second set of summing NAND gates 70–72. More specifically, the output terminal of the first subtrahend NAND gate 36 connects to a first input terminal 73 on the fourth summing NAND gate 70, the output terminal of the second subtrahend NAND gate 37 connects to a second input terminal 74 on the fourth summing NAND gate 70, and an output terminal 75 on the fourth summing NAND gate 70 connects to the subtractor input terminal $B_1$. Similarly, the output terminal of the third subtrahend NAND gate 38 connects to a first input terminal 76 on the fifth summing NAND gate 71, the output terminal of the fourth subtrahend NAND gate 39 connects to a second input terminal 77 on the fifth summing NAND gate 71, and an output terminal 78 on the fifth summing NAND gate 71 connects to the subtractor input terminal $B_2$. And finally, the output terminal of the fifth subtrahend NAND gate 40 connects to a first input terminal 79 on the sixth summing NAND gate 72, the output terminal of the sixth subtrahend NAND gate 41 connects to a second input terminal 80 on the sixth summing NAND gate 72, and an output terminal 81 on the sixth summing NAND gate 72 connects to the subtractor input terminal $B_4$. The subtractor input terminal $B_8$ connects to a logic low voltage source terminal 82.

The subtractor output terminals $C_2$ and $C_4$ are connected to generate an emergency stop signal at an output terminal 108. Output $C_4$ connects through a third inverter circuit 109 to a first input terminal 110 on a second AND gate 111. Output $C_2$ connects to a second input terminal 112 on AND gate 111, and the AND gate output terminal forms the emergency stop output 108.

The comparator circuit 14 is completed by the connection of the subtractor output terminal $C_2$. The output terminal $C_2$ connects to the input terminal 83 of second inverter 84. Output terminal 85 on the second inverter 84 connects to a first input terminal 86 on an output NAND gate 87. A second input terminal 88 on the output NAND gate 87 connects to an output terminal 97 on a second OR gate 98. The second OR gate 98 is similar to OR gate 21 and it has a first input terminal 99 connected to the second clock phase terminal 19 and a second input terminal 100 connected to the third clock phase terminal 89.

OPERATION

To explain the operation of the comparator circuit 14 it is assumed that the machine tool member 1 is moving away from its zero reference point. In other words, the machine position dimension in the storage register 6 is increasing and the octal numbers embodied in the three-bit digital signals applied to the comparator 14 by the encoder bus 9 and register bus 13 are increasing. Under normal operating conditions, therefore, the encoder output on the bus 9 is increasing, and the least significant digit in the storage register 6 is updated by adding counts to the storage register 6. Under these circumstances J-K flip-flops 49 and 92 are set and a logic high voltage is generated to the direction bus 11. This directs the storage register 6 to add pulses, or counts generated on the counter bus 12. The logic high voltage generated at Q terminal 91 is applied to enable the second, fourth and sixth minuend NAND gates 25, 27 and 29, as well as the first, third and fifth subtrahend NAND gates 36, 38 and 40. As a result, the encoder output signal on the bus 9 is conveyed through the minuend NAND gates 25, 27 and 29, and through the summing NAND gates 57, 58 and 59 to the input terminals $A_1$, $A_2$ and $A_4$ of the subtractor 15. The octal number, or count embodied in the encoder output signal thereby becomes the minuend in the subtraction operation. Similarly, the count of the least significant digit on the register bus 13 is conveyed through the subtrahend NAND gates 36, 38 and 40, and through the summing NAND gates 70, 71 and 72, to the subtractor input terminals $B_1$, $B_2$ and $B_4$, and thereby becomes the subtrahend in the subtraction operation. The subtraction operation can be expressed as:
where
  A − B = C
  A = encoder count
  B = LSD count
  C = result The result of the subtraction operation is read out at the subtractor output terminals $C_1$, $C_2$, $C_4$ and $C_8$ each time a clock pulse is received at the strobe terminal 16. For each cycle of the clock pulse generator 17, three clock pulses are generated through the OR gate 21 to the strobe terminal 16. Consequently, for each cycle, the arithmetic difference between the encoder count and the least significant digit in the storage register 6 is generated three times by the subtractor 15.

Eight separate results are possible from the subtraction operation, and depending on the result, the comparator circuit 14 operates to either: add one count to the storage register 6 through the register bus 12; add two counts to the register 6; do nothing; or reverse the logic state of the direction bus 11 and subtract counts from the storage register 6.

The first action is taken when the encoder count is equal to the storage register count (A−B=C). In this instance the subtractor output terminals $C_2$ and $C_4$ are both at logic low voltages during the first clock pulse. Consequently, the J-K flip-flop 92 remains set and a logic high voltage is generated to NAND gate input terminal 86 through inverter 84. The same result occurs on the second clock pulse, however, the logic high at the NAND gate input terminal 86 is now conveyed through the output NAND gate 87 to the counter bus 12 as a result of the second-phase clock pulse applied to the second OR gate 98. One count is thus added to the LSD in the register 6 and it now leads the encoder by one count (A−B=−1). Because the subtractor input terminal $A_8$ is connected to a logic high voltage, however, this result is interpreted by the subtractor 15 as a difference of 7 (A+8−B=7). Consequently, when the third-phase clock pulse is generated, the "2" weighted subtractor output terminal $C_2$ will be at a logic high voltage, which high is inverted to inhibit the output NAND gate 87. At the completion of the three pulse cycle, therefore, the count in the storage register 6 leads the encoder output count by one.

If the encoder leads the storage register count by one (A−B=1) when the clock pulse generator 16 is cycled, two counts are added to the storage register 6. The operation is the same as described above except the subtractor output terminal $C_2$ remains at a logic low voltage during the generation of both the second and third phase clock pulses. Thus, two counts are generated through the second OR gate 98 and the output NAND gate 87 to the storage register 6. As in the first situation described above, the storage register 6 leads the encoder output count by one at the end of the cycle.

A third situation exists if the storage register 6 leads the encoder by either one or two counts when the clock pulse generator 17 is cycled. This situation may occur, for example, if an erroneous count is inserted in the storage register 6 due to noise signals. Regardless of the cause, the comparator circuit 14 neither adds or subtracts a count in this situation, and the system corrects itself when the encoder count subsequently increases due to machine tool displacement. When the storage register count leads the encoder count by one or two, the subtractor 15 operates to generate an arithmetic difference of six or seven at its output terminals $C_1$, $C_2$ and $C_4$. Consequently, output terminal $C_2$ is at a logic high voltage during the three clock pulses and the output NAND gate 87 remains inhibited during the entire cycle. It should be noted that logic low is also applied to AND gate input terminal 102 during the first clock pulse to prevent the logic high at subtractor output terminal $C_4$ from resetting flip-flop 92.

As can be seen by the above situations, when the machine tool member 1 is moving away from the machine reference point, the storage register 6 is continuously updated to maintain it one count ahead, or higher than the count of the shaft encoder output signal. However, when a direction change is commanded by the position unit 7, the machine tool member 1 reverses direction and begins to move towards the machine tool reference point. As a result, the count embodied in the shaft encoder output signal begins to decrease. Eventually the situation will arise in which the shaft encoder is three or four counts less than the least significant digit in the storage register 6. When the clock pulse generator 17 is cycled in this instance, the comparator circuit 14 operates to switch the logic state of the direction bus 11, reduce, or subtract counts from the least significant digit in the storage register 6, and reverse the connection of the encoder and register buses 9 and 13 to the subtractor 15.

The three direction changing operations performed by the comparator 14 occur in synchronism with the three clock pulses. During the first-phase clock pulse the subtractor 15 operates to generate the arithmetic difference four or five at its output terminals $C_1$, $C_4$ (A+8−B=4 or 5). As a result, logic high voltages are applied to both input terminals 102 and 103 of AND gate 101 and the second J-K flip-flop 92 is reset by the trailing edge of the first-phase clock pulse applied to its clock terminal 94. Its Q terminal 91, therefore, changes to a logic low voltage which is applied to the direction bus 11. Also, the logic state of Q terminals 50 and 91 of J-K flip-flops 49 and 92 are now opposite and the exclusive OR gate 104 operates to generate a logic high voltage to the counter 106. Three rapid counts are generated by the enabled counter 106 to the counter bus 12. These counts are subtracted from the least significant digit in the register 6 because direction bus 11 is now at a logic low voltage. At this time the first, third and fifth minuend NAND gates 24, 26 and 28 are enabled and the second, fourth and sixth subtrahend NAND gates 37, 39 and 41 are enabled by the second flip-flop 92, to effectively reverse the application, or connection of the encoder bus 9 and register bus 13 to the subtractor 15. When the second-phase clock pulse is generated, therefore, the storage register 6 is either equal to or one count greater than the shaft encoder 8, and the arithmetic difference of zero or one (A−B=0 or A−B=1) is generated at the subtractor output terminals $C_1$, $C_2$ and $C_4$. Consequently, an additional count is subtracted from the storage register 6 during the second phase clock pulse. During the third-phase clock pulse, the arithmetic difference of either zero (A−B=0) or seven (A−8−B=7) is generated at the subtractor output terminals $C_1$, $C_2$, and $C_4$. In the first case another count is subtracted from the storage register 6, and in the second case no counts are generated. Finally, the trailing edge of the third-phase clock pulse applied to the clock terminal 51 of the first J-K flip-flop 49, resets it. Consequently, Q terminal 50 goes to a logic low voltage and $\bar{Q}$ terminal 48 goes to a logic high voltage.

As the machine tool member 1 continues to move toward the machine reference point the subtractor 15 now operates during each cycle of the clock pulse generator 17 to subtract the count embodied in the shaft encoder output signal from the least significant digit in the storage register 6. Or in other words:
where
A − B = C A = LSD count
B = encoder count
C = result The comparator 14 continues to perform essentially as explained above. By interchanging the application of the buses 9 and 13 to the subtractor 15, however, the least significant digit in the storage register 6 is updated by subtracting counts, and after each cycle of the clock pulse generator 17, the storage register 6 is left with one less count than the encoder output signal.

It should be apparent to those skilled in the art that the functions of the position input 7, arithmetic unit 5, storage register 6 and comparator 14 can be performed by a properly programmed digital computer or controller. Additionally, it should be apparent that the hardware, regardless of its form, need not be dedicated to monitoring the shaft encoder bus 9. Instead, with appropriate hardware and/or software, the functions provided by the comparator 14 can be performed simultaneously on a plurality of shaft encoder signals by using time-sharing techniques. The shaft encoder 8 functions as a short term memory between each updating operation, thus freeing the hardware to perform other functions during these intervals. In the preferred embodiment such other functions include updating the machine position dimension for the remaining two axes of machine tool motion.

We claim:

1. A method of updating a machine position dimension contained in a storage register, the steps comprising:
   sensing machine displacement with a digital absolute position transducer;
   periodically comparing the number of counts embodied in the position transducer output with the number of counts embodied in the least significant digit in said storage register; and
   advancing the count embodied in the least significant digit in said storage register when said compared counts differ by predetermined amounts.

2. The method as recited in claim 1 wherein the count embodied in said least significant digit in said storage register is advanced by adding counts when said machine is displaced in one direction and is advanced by subtracting counts when said machine is displaced in the opposite direction.

3. A position transducer for a numerically controlled machine, the combination comprising:
   a digital absolute position transducer connected to sense and indicate increments of machine displacement;
   a storage register operable to receive and store counts which form the machine position dimension, each count representing one increment of machine displacement; and
   a comparator connected to said digital absolute position transducer and said storage register, said comparator being operable to periodically update the counts in said storage register by first arithmetically comparing the number of counts embodied in the least significant digit of said machine position dimension with the number of increments indicated by said digital absolute position transducer, and when said numbers differ by predetermined amounts, generate a count to said storage register.

4. The position transducer as recited in claim 3 wherein said digital absolute position transducer is an encoder having a capacity sufficient to generate X number of discrete digital output signals, where X is substantially equal to the maximum possible number of counts embodied in the least significant digit of said machine position dimension.

5. The position transducer as recited in claim 4 wherein said comparator includes a subtractor having a first set of inputs connected to read the number of counts embodied in the least significant digit of said machine position dimension, a second set of inputs connected to receive the digital signals from said encoder, and a set of output terminals connected to said storage register.

6. The position transducer as recited in claim 5 wherein said comparator includes logic gate means connected to said first and second set of subtractor input terminals for reversing the connections thereof when said machine changes its direction of movement.

* * * * *

UNITED STATES PATENT OFFICE
CERTIFICATE OF CORRECTION

Patent No. 3,752,969        Dated   August 14, 1973

Inventor(s) William W. Kiffmeyer and Joseph D. Radtke

It is certified that error appears in the above-identified patent and that said Letters Patent are hereby corrected as shown below:

| | |
|---|---|
| Column 1, line 59 | change "an" to – and – |
| Column 4, line 46 | change "generator 1" to – generator 17 – |
| Column 6, line 9 | change "and and" to – and – |
| Column 6, line 18 | change "termianl" to – terminal – |
| Column 8, line 37 | change "generator 16" to – generator 17 – |
| Column 9, line 51 | change "(A–8–B=7)" to – (A+8–B=7) – |

Signed and sealed this 25th day of December 1973.

(SEAL)
Attest:

EDWARD M. FLETCHER, JR.      RENE D. TEGTMEYER
Attesting Officer               Acting Commissioner of Patents